United States Patent [19]

Michel

[11] Patent Number: 5,699,420

[45] Date of Patent: Dec. 16, 1997

[54] BELL SOUND SYNTHESIZER

[75] Inventor: Alan Dean Michel, Noblesville, Ind.

[73] Assignee: Lucent Technologies Inc., Murray Hill, N.J.

[21] Appl. No.: 363,507

[22] Filed: Dec. 23, 1994

[51] Int. Cl.⁶ .................................................. H04M 1/21
[52] U.S. Cl. .............................. 379/373; 379/88; 379/374
[58] Field of Search .......................... 379/373, 378, 379/377, 413, 418, 374, 375; 340/384, 384 R; 84/1.22, 1.23, 1.24, 1.26, DIG. 12

[56] References Cited

U.S. PATENT DOCUMENTS

| | | | |
|---|---|---|---|
| H118 | 9/1986 | Biggs et al. | 379/374 |
| 3,946,600 | 3/1976 | Rettig et al. | 73/71.4 |
| 4,132,871 | 1/1979 | Lake | 379/374 |
| 4,401,975 | 8/1983 | Ferguson et al. | 340/384 |
| 4,652,701 | 3/1987 | Cubison, Jr. | 379/412 |
| 4,823,090 | 4/1989 | Coleman et al. | 328/114 |
| 4,847,577 | 7/1989 | Gerhart et al. | 328/111 |
| 4,908,854 | 3/1990 | Lofmark | 379/373 |
| 5,159,627 | 10/1992 | Hama | 379/374 |
| 5,195,130 | 3/1993 | Weiss et al. | 379/98 |
| 5,323,455 | 6/1994 | Le Corre | 379/373 |
| 5,323,456 | 6/1994 | Oprea | 379/375 |

*Primary Examiner*—Krista M. Zele
*Assistant Examiner*—Jacques M. Saint-Surin

[57] ABSTRACT

The invention concerns digital synthesis of multiple frequencies a telephone, which are combined, in order to produce a replica of a bell sound. The invention also concerns detection of a power failure, and actuation of a low-power annunciator, which rings when a ring signal is received on a telephone line.

2 Claims, 3 Drawing Sheets

BELL SOUND SYNTHESIZER

The invention concerns digital synthesis of sinusoidal signals, and also the combination of decaying sinusoids of different frequencies, in order to produce a bell-like sound, for alerting a telephone.

BACKGROUND OF THE INVENTION

Early telephones used a pair of brass bells which were struck by a clapper which was driven by an electromagnet powered by an incoming ring signal. Many modern telephones have substituted a piezoelectric transducer.

The piezoelectric transducer produces an audible signal, which resembles a chirp, rather than a bell tone. It is believed that many telephone users prefer the sound of an actual bell.

SUMMARY OF THE INVENTION

In one form of the invention, digitally synthesized sinusoids are applied to a speaker in a telephone, when a ring signal is detected. The sinusoids produce a sound which resembles a bell.

DETAILED DESCRIPTION OF THE INVENTION

Figure 1:
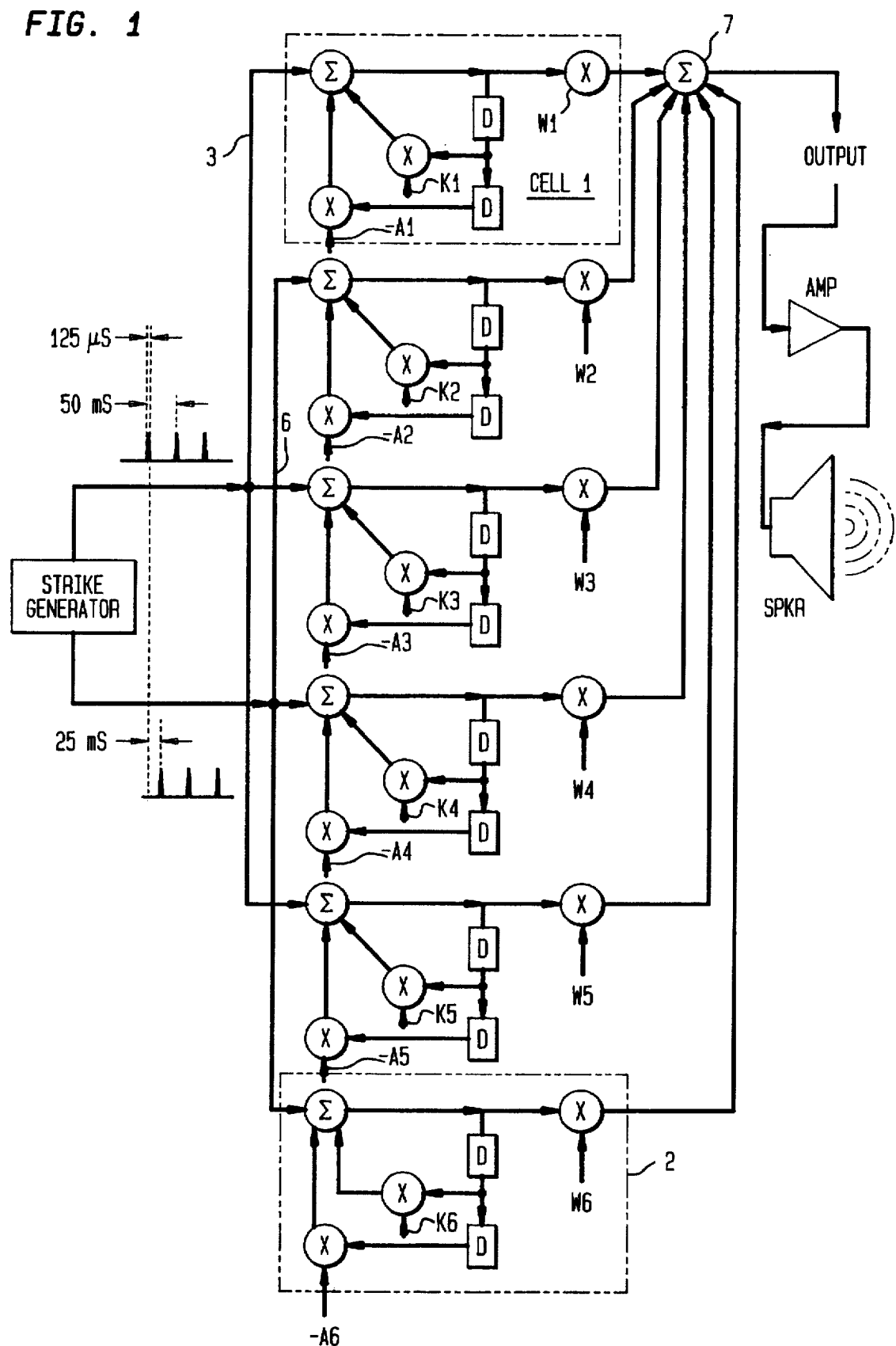
FIG. 1 illustrates apparatus for digital synthesis of six sinusoids.

FIG. 1 illustrates six digital synthesizers. One is contained in dashed box 2. Each contains two delay blocks D, each of which imposes a delay of 125 microseconds. Each is fed two voltage signals, an A and a K signal.

It can be shown, using Goertzel's Algorithm, that the output of each synthesizer cell is a function of the following form:

$$Ke^{-t/T} \cos(2\pi F_o t)$$

Wherein K is a constant and t represents time. The output is a decaying sinusoid, which decays with a time constant T and a has a frequency $F_o$.

The six cells of FIG. 1 are designed to produce the sounds of two individual bells. That is, the cells are divided into two groups, each containing three cells. Each group produces one bell sound. Two bells are simulated in order to replicate the two bells used in telephone sets.

One approach to selecting the frequencies for each bell is to ring an actual bell, analyze the frequency spectrum using a spectrum analyzer, and identify the three dominant frequencies. These three frequencies indicate the three $F_o$'s which are to be simulated by the three cells in the group.

Once the frequencies have been selected, the "K" and "A" for each cell selected, according to the following formulas:

$$K_n = 2A_n \cos(2\pi F_o/F_s)$$
$$A_n = e^{-1/F_s T}$$

Wherein $F_s$ is the sample rate of each cell and $F_o$ is the frequency which the cell is to produce. Because a sample rate of 8,000 Hz is commonly used in telecommunication equipment for other purposes, it was chosen as the sample rate $F_s$.

For example, assume that a frequency of 440 Hz (corresponding to middle C) is to be generated by cell number 1 (thus, n=1). Assume that a decay time constant, T, is chosen to be 0.1 second. With these values, $$A_1 = e^{-1/(8,000\ 1/sec \times 0.1\ sec)} = e^{-1/800} = 0.99875$$

and $$K_1 = 2 \times 0.99875 \cos(2\pi 440/8,000) = 1.998 \cos 0.3454 = 1.998 \times 0.941 = 1.88.$$

The remaining A's and K's are computed in the same way.

The decaying sinusoid produced by each cell is weighted by a weighting factor W, in order to adjust the relative loudness of the cell's tone within the overall chord which is produced. The weighted, decaying tones are summed in a summer 7.

The of the summer 7 leads, eventually, to an amplifier AMP and to speaker, which converts the decaying sinusoids into audible sound.

The groups of cells are not actuated simultaneously, because, as stated above, each group represents one bell in a pair of bells. Actual, real-world telephone bells are alternately struck by a clapper at the rate of about 20 Hz. The clapper strikes one bell, then the other.

Similarly, the simulated bells of FIG. 1 are alternately "struck," at 20 Hz. An actuation signal, produced by a STRIKE GENERATOR, produces two trains of pulses, both having periods of 50 milliseconds (mS), which correspond to 20 Hz. The pulse width is 125 microseconds, μS, as indicated. However, the trains are out-of-phase by one-half period (25 mS), as indicated.

ALTERNATE SIMULATOR

Figure 2:
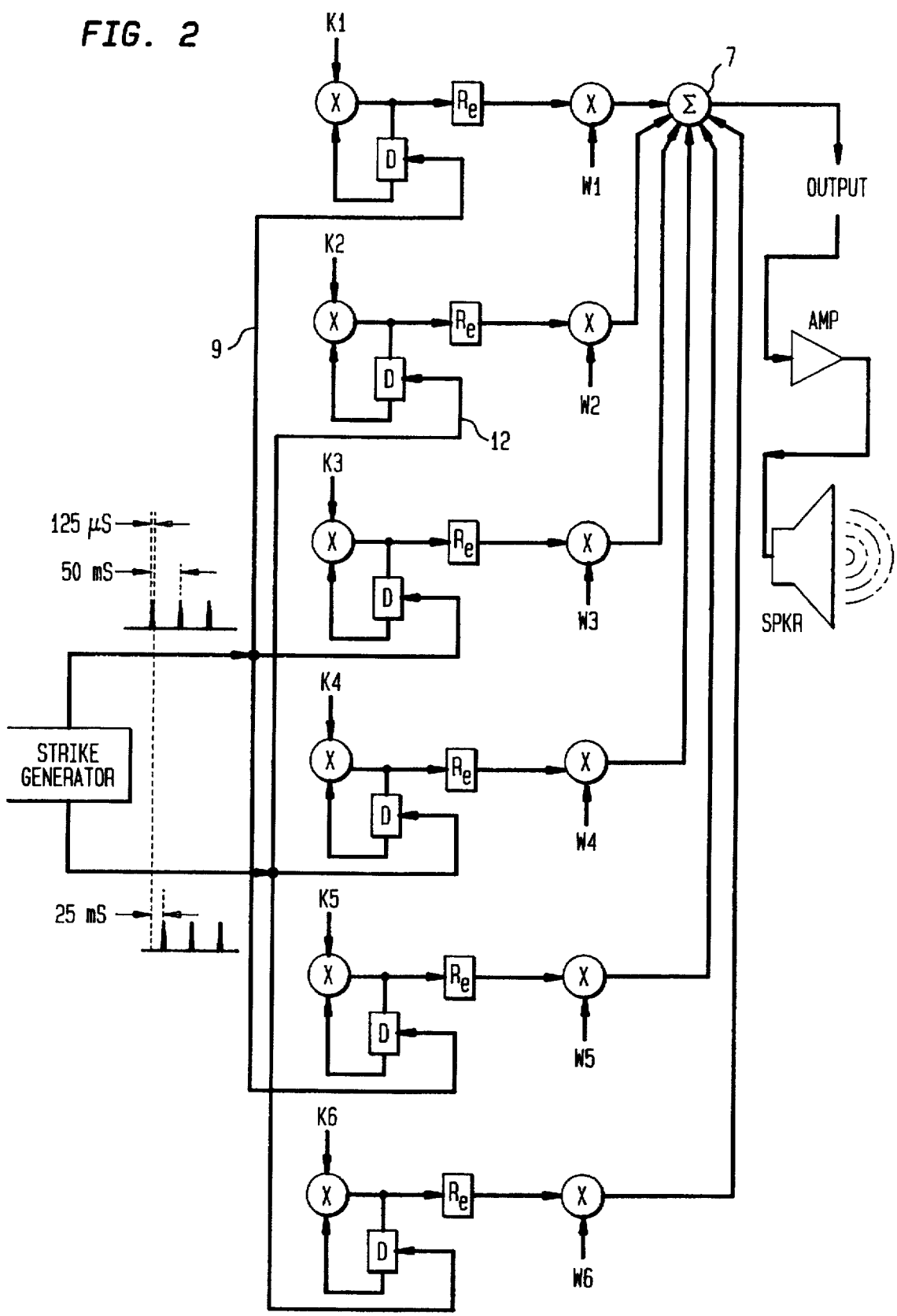
FIG. 2 illustrates an alternate apparatus for synthesis of sinusoids.

FIG. 2 illustrates a different approach to bell simulation. The general approach of FIG. 2 is similar to that of FIG. 1, but with the following exceptions:

Each K signal, such as $K_1$, is complex, and computed using the following espression:

$$K_n = e^{-1/F_s T}[\cos(2\pi F_o/F_s) + j \sin(2\pi F_o/F_s)]$$

In FIG. 2, the symbol "Re" means "use the real part."

In one group of cells, all D blocks are fed by line 9. In the other group all D blocks are fed by line 12. To simulate striking, all D's in a group are set to 1+j0, by the appropriate line 9 or 12. To cause silence, all D's in a group are set to 0+j0.

POWER OUTAGE PRECAUTION

The telephone set obtains operating power from wall current. If electric power fails, as during a thunderstorm, telephone service should not terminate. During the power failure, the telephone line is still able to supply sufficient power for communication, but not for extra power-consuming features, such as, possibly, bell synthesizers.

Figure 3A:
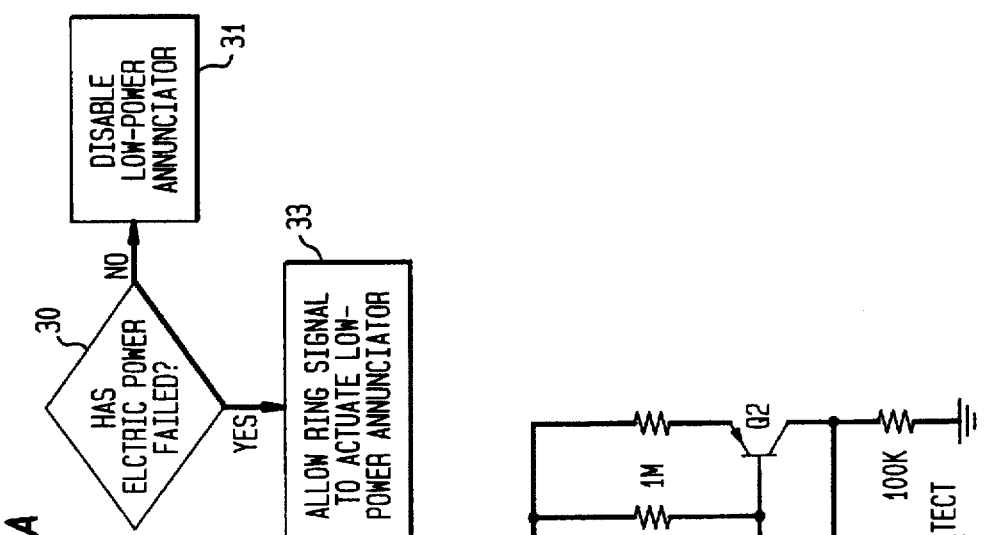
FIG. 3A illustrates a circuit for generating a ring signal during a power failure.

FIG. 3A provides a high-level description of the operation of one form of the invention. Block 30 detects whether electric power is available. If so, normal use of the sine wave generators, shown in FIG. 1, is allowed, and auxiliary, low-power annunciators are not used. Disablement of the low-power annunciator is indicated by block 31 in FIG. 3A. Disablement is done, not primarily to reduce power consumption, but to avoid audible interference with the bell syntheziser, which produces a higher quality sound.

If power has failed, block 33 is reached. The sine wave generators, or other annunciators which consume high power, have been disabled, because of the loss of electric power. An auxiliary, low-power, annunciator, such as a piezo-electric transducer, is actuated as a replacement.

ONE IMPLEMENTATION

Figure 3:
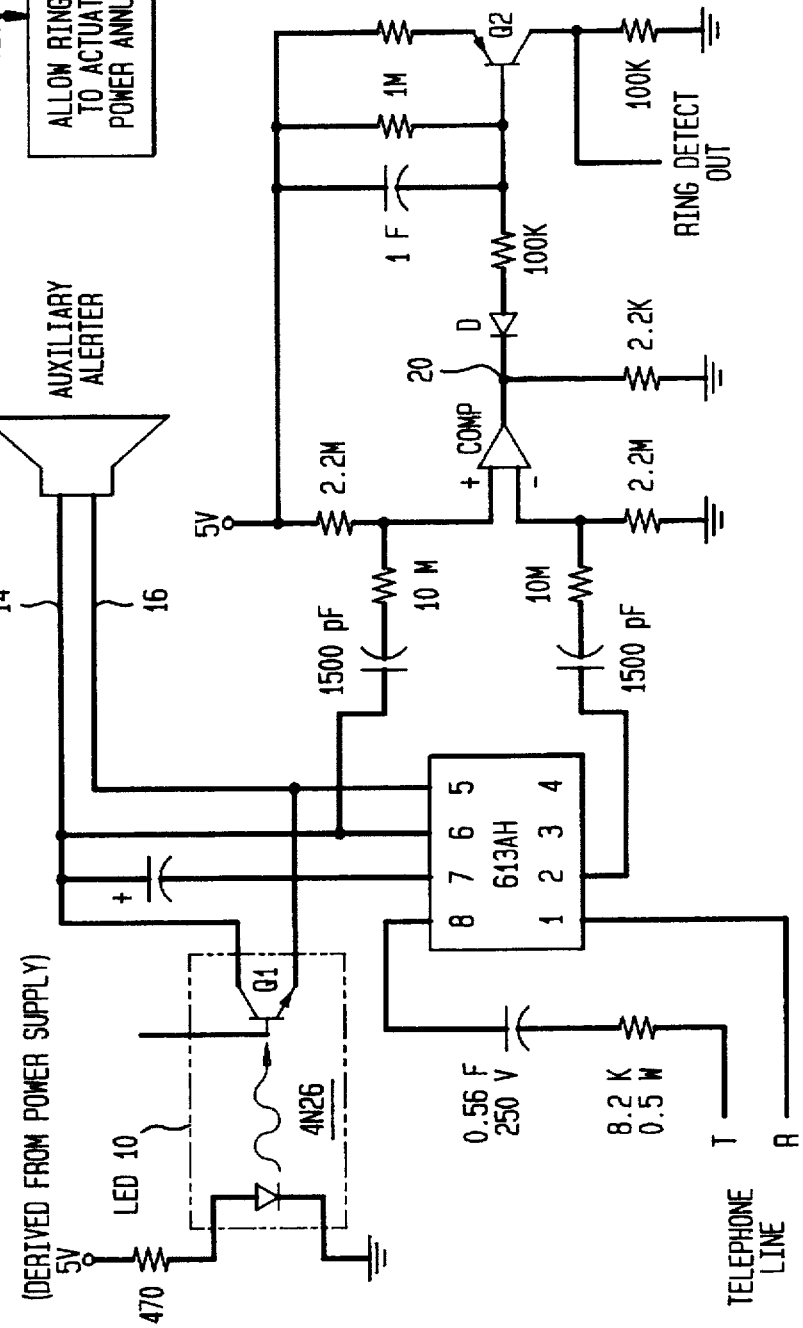
FIG. 3 illustrates logic for disabling a low-power audio transducer normal operating power is available.

There are numerous circuits which can implement the logic of FIG. 3A. FIG. 3 shows one of them.

FIG. 3 illustrates a circuit which supplies an auxiliary ring generator when a power outage occurs. A light-emitting diode LED 10, contained within the integrated circuit labeled 4N26, produces when a voltage delivers current through the 470-ohm resistor. This voltage is taken from a power supply which is powered by wall current.

The light impinges on the base of a phototransistor Q1, driving the phototransistor into conduction, and, in effect, creating a short circuit across leads 14 and 16, which connect to an AUXILIARY ALERTER, or low-power speaker. With this short-circuit present, the ALERTER is forced to remain silent.

If a ring signal is received on the TELEPHONE LINE, which contains tip, T, and ring, R, lines, a ring detector (integrated circuit 613AH) produces a square wave signal between pins 2 and 6, which feed a comparator COMP, causing the output 20 of the comparator to alternately jump high and low.

When low, the output 20 pulls the base of PNP transistor Q2 low, driving Q2 into conduction, thereby pulling the RING DETECT OUT high. When high, the output 20 becomes disconnected from Q2, by virtue diode D. Consequently, Q2 shuts off, and RING DETECT OUT is eventually pulled to ground.

Therefore, when wall power is present, the light produced by the LED a ring signal to pull RING DETECT OUT high. Other circuitry, not shown, detects RING DETECT OUT, and actuates the simulated bell described in FIG. 1. In addition, at this time, the AUXILIARY ALERTER is forced off by Q1.

If power fails, the LED ceases to produce light. The short circuit imposed by transistor Q1 terminates. Because of the characteristics of the 613 AH integrated circuit, the ring signal is allowed to reach the AUXILIARY ALERTER. The ALERTER is a low-power consumption device, and, at this time, draws power from the telephone line.

No RING DETECT OUT signal is produced, because the same power which supplies the LED also supplies Q2. This power supply has terminated, so the RING DETECT OUT signal is pinned at ground.

Further power to the bell-synthesizing circuitry of FIGS. 1 and 2 has also terminated, so that this circuitry is forced into silence.

SIGNIFICANT FEATURES

1. The sinusoids produced by the synthesizers of FIG. 1 are chosen to represent the major frequency components, or harmonics, of two actual bells. The decay rate of the respective sinusoids are also chosen to match those of the corresponding frequency components of the bells.

Thus, the sinusoids possess the frequency characteristics and time behavior of selected harmonics of the bells.

Numerous substitutions and modifications can be undertaken without departing from the true spirit and scope of the invention. What is desired to be secured by Letters Patent is the invention as defined in the following claims.

I claim:
1. In a telephone set, the improvement comprising:
   a) means for digitally synthesizing a decaying sinusoid, using a digital synthesizer, in response to an incoming ring signal, wherein
      i) digital inputs K and A are applied to the digital synthesizer, and
      ii) said inputs K and A are related to frequency of the decaying sinusoid according to the following expressions:

$$K = 2A \cos(2\pi F_o/F_s)$$

$$A = e^{-1/F_s T}$$

wherein
      $F_o$ is the frequency of the decaying sinusoid;
      $F_s$ is sample rate of the digital synthesizer; and
      T is a time constant of decay of the decaying sinusoid; and
   b) means for converting said sinusoid into an audible signal.
2. In a telephone set, the improvement comprising:
   a) a first digital synthesizer, which synthesizes a decaying sinusoid, having
      i) a first frequency and
      ii) a first decay rate;
   b) a second digital synthesizer, which synthesizes a second decaying sinusoid, having
      i) a second frequency, different from the first frequency, and
      ii) a second decay rate, different from the first decay rate; and
   c) a third digital synthesizer, which synthesizes a third decaying sinusoid, having
      i) a third frequency, different from both the first and second frequencies, and
      ii) a third decay rate, different from both the first and second decay rates; and
   b) means for converting said sinusoids into an audible signal, in response to an incoming ring signal.

* * * * *